United States Patent
Rußlies

(10) Patent No.: US 9,970,773 B2
(45) Date of Patent: May 15, 2018

(54) NAVIGATION SYSTEM FOR ACCESSING NAVIGATION DATA STORED IN AN ACCESS-PROTECTED MANNER

(75) Inventor: Lars Rußlies, Hamburg (DE)

(73) Assignee: HARMAN BECKER AUTOMTOIVE SYSTEMS GMBH, Karlsbad (DE)

( * ) Notice: Subject to any disclaimer, the term of this patent is extended or adjusted under 35 U.S.C. 154(b) by 648 days.

(21) Appl. No.: 11/261,428

(22) Filed: Oct. 27, 2005

(65) Prior Publication Data

US 2006/0184531 A1 Aug. 17, 2006

(30) Foreign Application Priority Data

Oct. 27, 2004 (EP) ..................................... 04025576

(51) Int. Cl.
*G06F 21/00* (2013.01)
*G01C 21/32* (2006.01)
*G06F 21/10* (2013.01)
*G06F 21/62* (2013.01)

(52) U.S. Cl.
CPC ............. *G01C 21/32* (2013.01); *G06F 21/10* (2013.01); *G06F 21/6209* (2013.01)

(58) Field of Classification Search
CPC ...... G01C 21/32; G06F 21/6209; G06F 21/10
USPC ................................................. 726/26; 707/9
See application file for complete search history.

(56) References Cited

U.S. PATENT DOCUMENTS

| | | | |
|---|---|---|---|
| 5,887,269 A | 3/1999 | Brunts et al. | |
| 6,088,450 A * | 7/2000 | Davis et al. | 713/182 |
| 6,107,933 A * | 8/2000 | Endo | 340/5.28 |
| 6,131,066 A * | 10/2000 | Ahrens et al. | 701/200 |
| 6,764,000 B1 * | 7/2004 | Graham | 235/379 |
| 6,768,942 B1 * | 7/2004 | Chojnacki | 701/200 |
| 2001/0001876 A1 * | 5/2001 | Morgan | H04L 9/0841 713/171 |
| 2001/0011254 A1 * | 8/2001 | Clark | 705/59 |
| 2001/0029427 A1 * | 10/2001 | Nagaki et al. | 701/208 |
| 2001/0047341 A1 * | 11/2001 | Thoone et al. | 705/59 |
| 2002/0083348 A1 | 7/2002 | Watanabe et al. | |
| 2002/0087261 A1 * | 7/2002 | Watanabe | G06Q 99/00 701/451 |
| 2003/0041221 A1 * | 2/2003 | Okada | G06F 21/10 711/164 |

(Continued)

FOREIGN PATENT DOCUMENTS

| | | |
|---|---|---|
| EP | 1 189 409 A2 | 3/2002 |
| EP | 1 219 930 A2 | 7/2002 |

(Continued)

OTHER PUBLICATIONS

Canadian Office Action.
Japanese Patent Office.

*Primary Examiner* — John B King
(74) *Attorney, Agent, or Firm* — Artegis Law Group, LLP

(57) ABSTRACT

A navigation system stores navigation data in an access-protected manner. The navigation system includes navigation units that utilize the navigation data retained in a memory. The system includes a module for authenticating the access code. The system may include a module for generating an access protection code for storing the navigation data in memory. The access code and the access protection code may be used in a complementary scheme to secure the navigation data set.

20 Claims, 5 Drawing Sheets

(56) References Cited

U.S. PATENT DOCUMENTS

| | | | | |
|---|---|---|---|---|
| 2003/0084313 | A1* | 5/2003 | Tada | G01C 21/32 |
| | | | | 713/193 |
| 2004/0044911 | A1* | 3/2004 | Takada et al. | 713/201 |
| 2004/0260923 | A1 | 12/2004 | Nakai et al. | |
| 2005/0060533 | A1* | 3/2005 | Woo | G06F 12/0215 |
| | | | | 713/100 |
| 2010/0004849 | A1* | 1/2010 | Jeong | G01C 21/367 |
| | | | | 340/995.12 |

FOREIGN PATENT DOCUMENTS

| | | | |
|---|---|---|---|
| JP | 10003432 | A | 1/1998 |
| JP | 10154131 | | 6/1998 |
| JP | 10283270 | | 10/1998 |
| JP | 2002351846 | A | 12/2002 |
| JP | 2003249011 | A | 9/2003 |
| JP | 2004055050 | A | 2/2004 |
| WO | 2001022767 | | 3/2001 |

* cited by examiner

NAVIGATION SYSTEM FOR ACCESSING NAVIGATION DATA STORED IN AN ACCESS-PROTECTED MANNER

PRIORITY CLAIM

This application claims the benefit of priority from European Application No. 04025576.2, filed Oct. 27, 2004 which this application incorporates herein by reference.

BACKGROUND OF THE INVENTION

Technical Field

The invention relates to navigation systems. In particular, the invention relates to navigation systems with access control.

Related Art

Navigation systems may provide a user with information on how to reach a destination. Such navigation systems may be implemented in portable devices or within cars Navigation systems use navigation data to navigate a route. The navigation data may include information on specific places or points of interest. Based on a starting point, an endpoint and map data, the navigation system may map a path to a destination.

The map data may be stored. The stored data may be linked to the navigation system. Some navigation systems include a non-volatile, writable memory that retains map data. The map data may be transferred from a disk.

Once the navigation data is stored in a navigation system, some systems no longer use the disk. In these systems, the distribution of the navigation data on the disk is not controlled and may be used in other systems.

SUMMARY

A navigation system stores navigation data in an access-protected manner. The navigation system includes navigation units that utilize the navigation data retained in a memory. The system includes a module for authenticating the access code. The system may include a module for generating an access protection code for storing the navigation data in memory. The access code and the access protection code may be used in a complementary scheme to secure the navigation data set.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Navigation systems provide information on how to reach a destination. Some navigation systems may be programmed in handheld global positioning systems (GPS). In some systems, the navigation systems are a unitary part of a head unit interfaced to a vehicle telematics system.

Navigation systems may accept map data from a non-volatile memory, such as a flash memory or media. With the navigation data stored in the memory of the navigation system, portable storage media containing the data may no longer be required.

Figure 1:
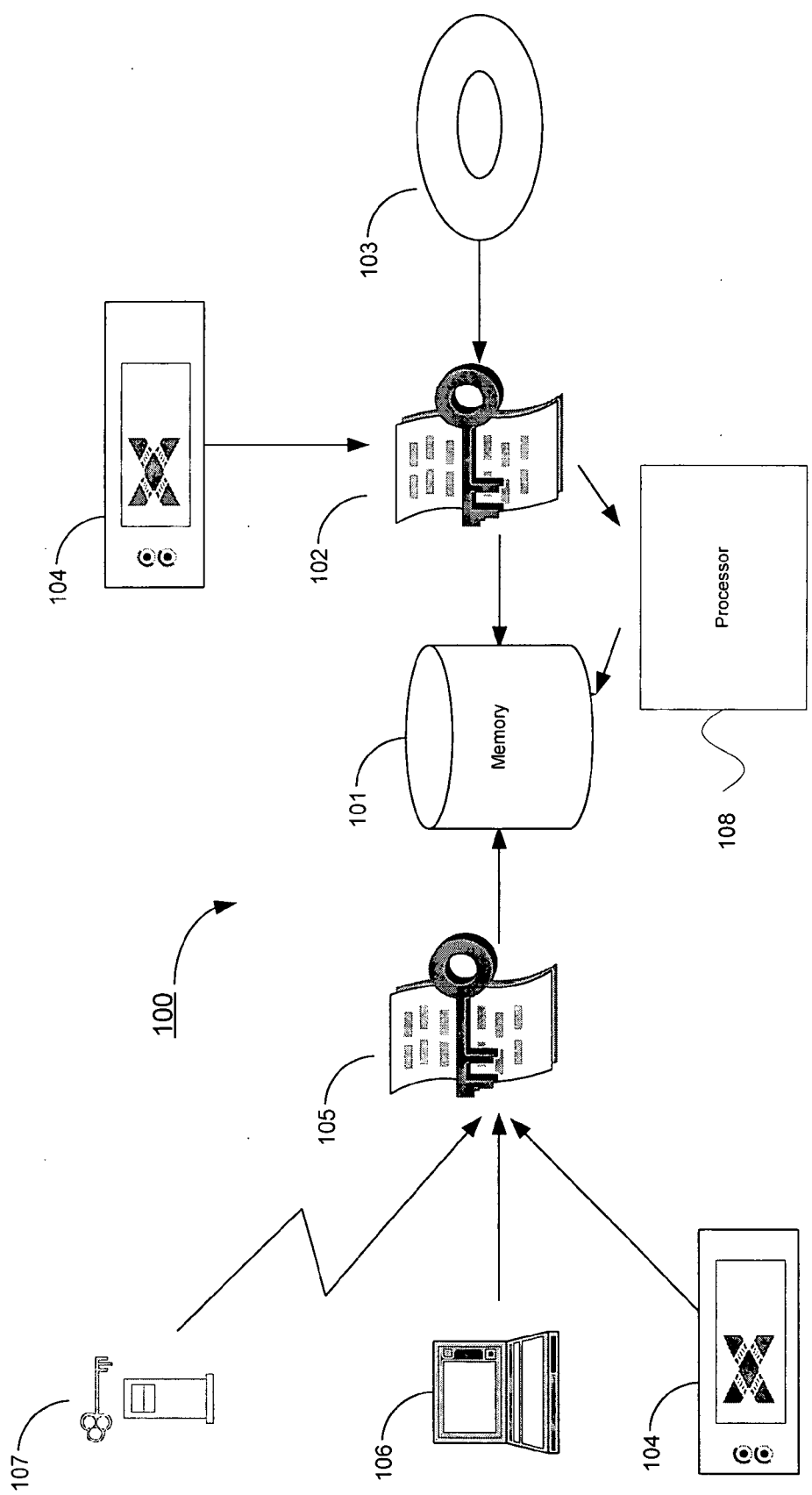
FIG. 1 is a block diagram of a navigation system.

FIG. 1 is a navigation system 100 that includes an access protection scheme for protecting navigation data stored in a memory. The navigation system 100 includes a navigation unit 104, a storage unit, such as a non-volatile, writable memory 101, an access protection code, such as an access protection key 102, and an access code 105. The system 100 may further include an external display or portable terminal, an access code storage unit, such as an access code server 107, and a removable storage medium, such as an optical disk 103. The navigation system 100 may include a module for checking an access code 105, such as a processor 108, or computer executable code resident to the memory 101, the removable storage 103, or the navigation unit 104 that may retain an access code 105.

The navigation data may include digital map data stored in memory 101 in an access-protected manner. The stored data may not be accessed by others not granted access. Storage in an access-protected manner may prevent the digital navigation data from being accessed freely. Access may be restricted and may only be enabled if a correct access code 105 is provided. In some systems, a valid access code 10S may permit use of the stored digital navigation data.

The navigation data may include map data. Digital map data may include road and street node information, facility and point of interest (POI) data, topographical and geographical data, phone directory and business information ("yellow page" information), and other data or data structures of interest.

The writable memory 101 may comprise a hard drive or a solid state memory such as flash memory, rewritable compact disc (CDRW), digital video disks, or rewritable digital versatile disk (DVD-RW) media, Zip or Jazz drives. The memory 101 may be a unitary part of a navigation system integrated within or interfaced to vehicle systems to provide a user with navigational information. The access protection key 105 and access code 102 may comprise an alphanumeric sequence encoded in a computer readable and executable medium or format. The access protection key 102 and access code 105 may also comprise a sequence that may be manually entered or aurally received.

In FIG. 1, the access protection key 102 may be created using two different inputs. First, an identification code for the navigation data originally stored on an optical disk 103 such as a CD or DVD may be used. The initial identification code may correspond to a version number of the data on the disk 103 to be stored in the memory 101. In addition, an identification code of the navigation unit 104 may be provided. The identification code of the navigation unit 104 may correspond to identifying information, such as the serial number of the navigation unit 104, which is a unique identification code.

Two identification codes may be used to create the access protection key 102. This may be accomplished in different ways. If the identification code of the navigation data and of the navigation unit 104 are alphanumeric, each identification code may be transformed into a number such as a natural number (e.g., 1, 2, 3 . . . etc). The resulting two numbers may be combined through a summation or multiplication. When natural numbers are used, these operands may yield a natural number access protection key 102. Depending on the type of access protection chosen, other methods may be also used, including other functions and mathematical relations.

To access the navigation data, an access code 105 may be necessary. The access code 105 may be identical to the access protection key 102. Depending on the access protection of the navigation data, the access code 105 may have multiple uses to enable access to the data. The access code 105 may be used to decrypt encrypted navigation data. In some systems, the access code 105 may be checked and allow direct access to the stored data without additional decryption, if the access code 105 is valid. The module for checking an access code 105 may be configured to decrypt the digital navigation data and/or to check an access keyword.

The access code 105 may be provided to the navigation system in many ways. The access code 105 may be entered directly through the navigation unit 104 using the input keys interfaced with the navigation unit 104 or a speech dialog system. The input may comprise a haptic input, a keyboard, or other interactive input provided with the navigation system 100. The access code 105 may also be provided through a wireless device such as a transmitter or a fob, such as a key fob. The wireless device may transmit the access code 105 to the navigation system 100. In addition, an access code server 107 may send the access code 105 on request to the navigation system. The navigation system 100 may include a wireless, optical, or wired interface and may comprise an Internet interface.

An external device such as a portable terminal 106 may also interface the navigation system 100. The access code 105 may be entered through an external device or retrieved from the memory of an external device. When some external devices are used, the access code 105 may be transmitted to the navigation system 100 when linked or coupled to the navigation system 100.

The access code 105 may be linked to the navigation system through a stored medium by storing it in the memory 101 of the navigation system 100. The access code also may be loaded into a volatile internal memory of the navigation system 100 or stored on a removable medium 103 such as a CD or DVD.

The system 100 may store access-protected navigation data in many ways. Parts or all of the data may be encrypted. In these systems, the data is decrypted before accessing the digital navigation data. The decryption key for decrypting the navigation data may include the access code 105. The decryption key may be formed from the access code using functions or mathematical logic that may include hash tables, key generation schemes, or other cryptographic schemes. The decryption key may be identical to the encryption key. A symmetric or asymmetric encryption method may be used. Other examples of cryptographic protocols used in some systems include PKI, DES, RSA, RS4, and other protocols.

The navigation data also may be encrypted through random characters, numbers, or combinations such as through a public key encryption method that may use a session key. A session key may be generated during a session (in which the data is encrypted). The random number, character, or combination may be obtained using any kind of random number generator using, for example, the current time, previous keystrokes of a user, or the position as determined by the navigation unit 104 as a seed. Using this session key, the data may be encrypted. Afterwards, the session key itself may be encrypted using a different key and, possibly, a different encryption method. When decrypting the data in some systems, the session key is decrypted first, before decrypting the data using the decrypted session key. This dual step decryption may be useful when using a more secure, more time consuming encryption method for encrypting the session key than for encrypting the data itself. Encryption of the data may be performed using a symmetric method. This may occur when the encryption key (i.e., the session key) is identical with the decryption key. The digital navigation data need not be encrypted, but access to the digital navigation data may require an access keyword. The keyword may correspond to a password enabling the access of the digital navigation data.

The navigation system 100 also may include a module for creating an access protection code, such as an access protection key 102. An access protection key 102 may be a code that may be used for storing data in an access protected way. The access protection key 102 may be a key for encrypting data. The access protection key 102 may be a code used for blocking access to the data (without encrypting the data) such that the access is only permitted if a valid access keyword is presented. In some systems, accessing the digital navigation data is possible only if the access code 105 matches the access protection key 102 in some way. The access protection key 102 may be the encrypting key and the access code 105 may be the decrypting key. The access protection key 102 may be created by algorithms, schemes, software, or logic resident to or interfaced with the navigation unit 104, the storage unit 103, or the removable storage 103

The access code 105 and the access protection key 102 may be derived from each other in some systems. In other systems, the access code 105 and the access protection key 102 may comprise a pair of keys in a public key encryption scheme. In some schemes, the private key (that may be responsible for the decryption of the data) may not be derived from the public key (that may be responsible for the encryption of the data). In some systems, the access code 105 and the access protection key 102 are identical.

To further restrict access to the digital navigation data, the module that creates an access protection key 102 may be configured to create an access protection key 105 using an identification code of the navigation unit 104 and/or or an identification code of the digital navigation data. Identification codes may include identifying data such as a serial number of the navigation unit 104, e.g., the serial number of the device, and/or of a disk on which the navigation data is stored and/or a version number of the navigation data. Because an access code 105 has to match the access protection key 102 in some systems, a valid access code 105 may also depend on the identification code of the navigation unit 104 and/or the identification code of the digital navigation data. The identification code of the navigation unit 104 and/or the identification code of the digital navigation data may be unique codes, such as when the identification code comprises a serial number of the navigation system or a disk. When a unique identification code is used, access to the data may be restricted to a specific navigation system. If the digital navigation data is stored in the memory of a different navigation system, the access protection code may be different, as would the corresponding access code.

The navigation system 100 may further include a module for encrypting the digital navigation data using the access protection key 102. Such a module may be implemented by software schemes, logic, or other computer executable code for encryption resident to or interfaced to the processor 108, navigation unit 104, or memory 101. The encryption key for the digital navigation data may depend on the access protection key 102. The access protection key 102 may be used as a key for encrypting the navigation data. The access protection key 102 may be also used for decrypting another key that may be used for encrypting the navigation data, such as a session key. Decrypting another key may be useful if a more complicated and time consuming method is used for encrypting a further key using the access protection key 102.

Figure 2:
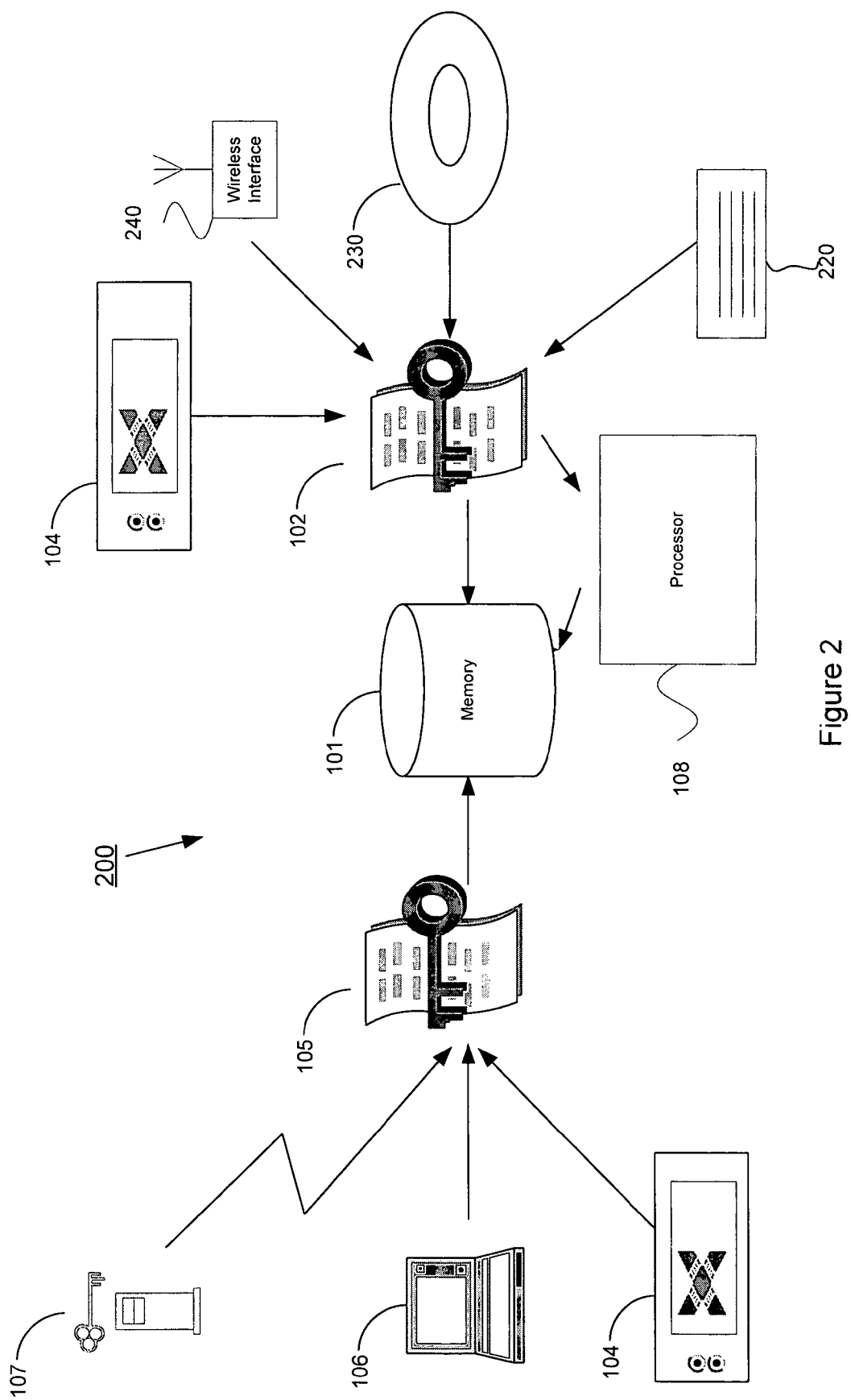
FIG. 2 is a second block diagram of a navigation system.

FIG. 2 is a navigation system 200 having inputs that may interface a keyboard 220, a storage unit, such as a disk drive 230, and a wireless, optical or wireless interface and may comprise an Internet interface 240 configured to receive an access code 105. The disk drive 230 may comprise an optical disk drive such as a DVD or CD drive, though the disk drive 230 may also be a floppy disk drive, Zip, Jazz, Syquest, non-volatile memory such as flash cards or universal serial bus (USB) drives, or other storage media. The disk drive 230 may be further configured to read an access code 105 stored on the removable disk 230.

The removable disk 230 may comprise a data storage unit that may be temporarily coupled or interfaced to the navigation system 200 when transferring programs or data to the navigation system 200. The navigation data may be stored on a removable disk 230. In some systems, substantially all necessary information may be stored on the disk, particularly, the navigation data that is transferred to memory of the navigation system and the access code 105. A disk drive 230 may be configured to read a copy protected access code retained on the disk drive 230. The access code 105 may not be copied from a disk 230 to a memory 101. Access to the navigation data may occur only if the disk 230 with the copy protected access code 105 is present or detected by the system 100. The digital navigation data and the access code 105 may be provided on a removable disk 230. After the navigation data is stored in memory of the navigation system 100, the stored navigation data may be accessed quickly. In some systems, it may be necessary to provide a valid access code 105 through a removable media or disk 230 to access the navigation data retained in the navigation system 100.

The access code 105 may be protected on a portable or removable disk 230 in many different ways. Copy protection may include at least one read fault error based on at least one defective sector of the removable disk 230. Due to defective sectors and corresponding read fault errors, copying may be prevented.

The copy protection may be based on an electronic fingerprint, comprising very short data tracks (such that the track cannot be copied by a copying device), encryption and/or data stored in regions, or sectors not accessible by copying devices. In other systems, the access code 105 or the entire access code 105 may not be accessible to copying devices or that are only accessible or readable by the peripheral components of the navigation system 100.

The authentication of an access code 105 may occur regularly while a navigation system 100 routes a safe and/or efficient path from one point to another. The access code 105 may be also checked periodically after a predetermined time interval and/or after a predetermined number of times of accessing the digital navigation data. Periodic authentication of the access code 105 during operation may validate a user's right to access data. In the systems that store the access code 105 on a portable medium, periodic authentication may prevent using the portable medium on other navigation systems.

Figure 3:
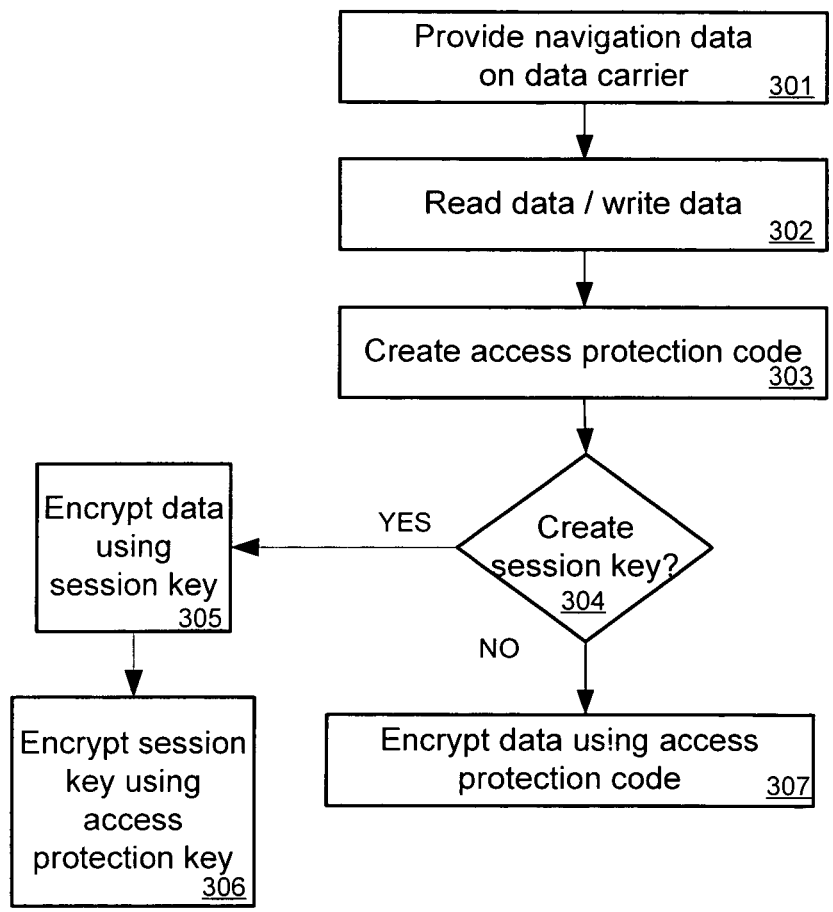
FIG. 3 illustrates a process that stores navigation data in a memory.

FIG. 3 illustrates a process that stores digital navigation data in a navigation system 100 that may have a non-volatile, writable memory 101. The method writes or stores, at act 301, navigation data in memory 101. The system 100 may write the navigation data to the memory 101 or read the data from the memory 101 (act 302) before the system 100 routes a course. In some systems, all of the navigation data may not be written to memory. In some other systems, the navigation system may read data from the portable medium while routing a path, making the memory that appears to the system to be larger or more uniform, like a virtual memory. The navigation data may include digital map data, such as geographical data, route planning information, points of interest (POI), topographical data, facilities and/or building information, and traffic information.

The navigation data may be stored in an access protected way that restricts use. An access protection key 102 may be created, at act 303, during or after writing the navigation data to the memory 101. The access protection key 102 may not exist before writing the digital navigation data into the memory. For the systems, not creating an access protection key 102 before loading the digital navigation data may increase security. The access protection key 102 may encrypt all or some stored data in the memory 101.

Some systems may create an additional session key similar to public encryption methods. A session key may comprise a random number, character, or combination based on one or more predetermined parameters. For example, a random number or character may be derived from the keystrokes of the navigation unit 104 and/or using positional or movement parameters provided to the navigation system 100. The system 100 may determine if a session key should be created, at act 304. If a session key is created, the session key may be used to encrypt, at act 305, the navigation data. The session key may be then encrypted, at act 306, using the access protection key 105 based on the serial number of the navigation unit 104 and/or the version number of the navigation data.

In these methods, access to the data may depend on the identification code of the navigation unit 104 and/or the identification code of the digital navigation data. The access protection key 102 may be linked to the specific navigation unit 104 and/or the specific version of the data, which may further increase system-specific security. In some circumstances, a user may access the data stored on a specific navigation system but may not access the data on another navigation system. Possible identification codes may include a serial number of the navigation unit 104 and/or of a portable medium such as a disk on which the digital navigation data is stored and/or a version number of the digital navigation data. The identification code of the navigation unit 104 and/or the identification code may be a unique code.

If a session key is not created, at act 304, the stored navigation data may be encrypted, using the access protection key 102. This encryption need not be performed with the access protection key 102 alone, but may be based on a session key as well. Different encryption methods may be used such as DES, IDEA, RC5, RSA, or DHA.

Figure 4:
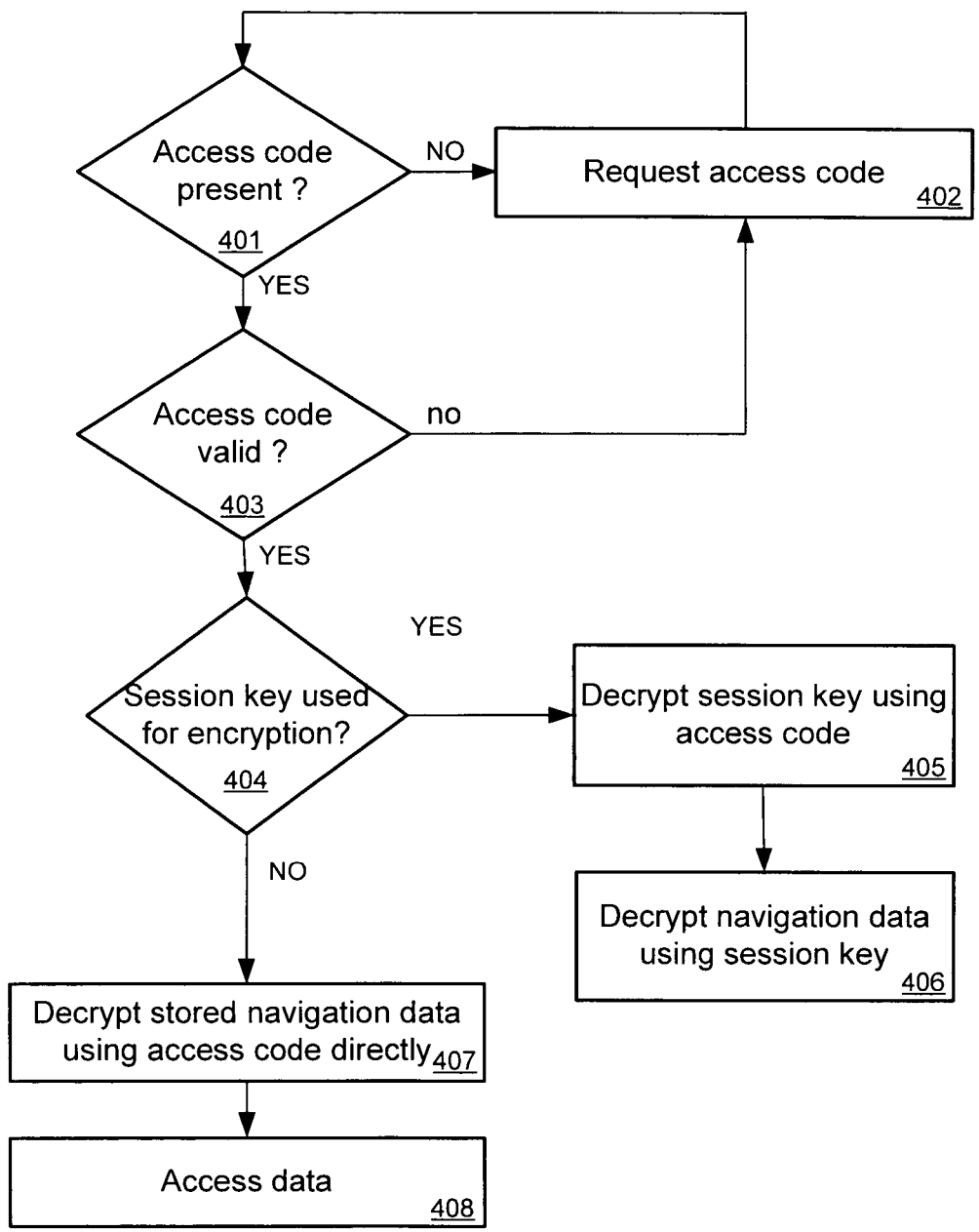
FIG. 4 illustrates a process that accesses stored navigation data.

FIG. 4 illustrates a process to access navigation data that may be stored in a non-volatile, writable memory 101 of a navigation system 100. The navigation data may be stored through an access-protected scheme. At act 401, the navigation system 100 may detect whether an access code 105 is present. The access code 105 may be supplied through a user input such as a keyboard 220 or by a device such as a disk 230 or portable media. If an access code 105 is not detected, an access code 105 may be requested, at act 402. The request may prompt a corresponding user.

If an access code 105 is detected, the access code 105 may be authenticated, at act 403. In some systems, the access code 105 may be authenticated using security challenge and integrity methods such as checksum and error correction algorithms, or access code authentication routines. If the access code 105 is not validated, the method may return to act 402. If a valid access code 105 is detected, the stored navigation data may be decrypted. The decryption may vary with the stored data. In some methods, the access code 105 may use a decryption key. If the navigations system 100 determines that a session key was created to encrypt the data, at act 403, the access code 105 may be used to decrypt the session key, at act 405, which, in turn, may be used to decrypt the stored navigation data, at act 406. If the system 100 determines that a session key was not created, at act 403, the system 100 may directly decrypt the navigation data using the access code 105, at act 407. After the stored navigation data is decrypted, the navigation data may be accessed, at step 408, and processed.

Figure 5:
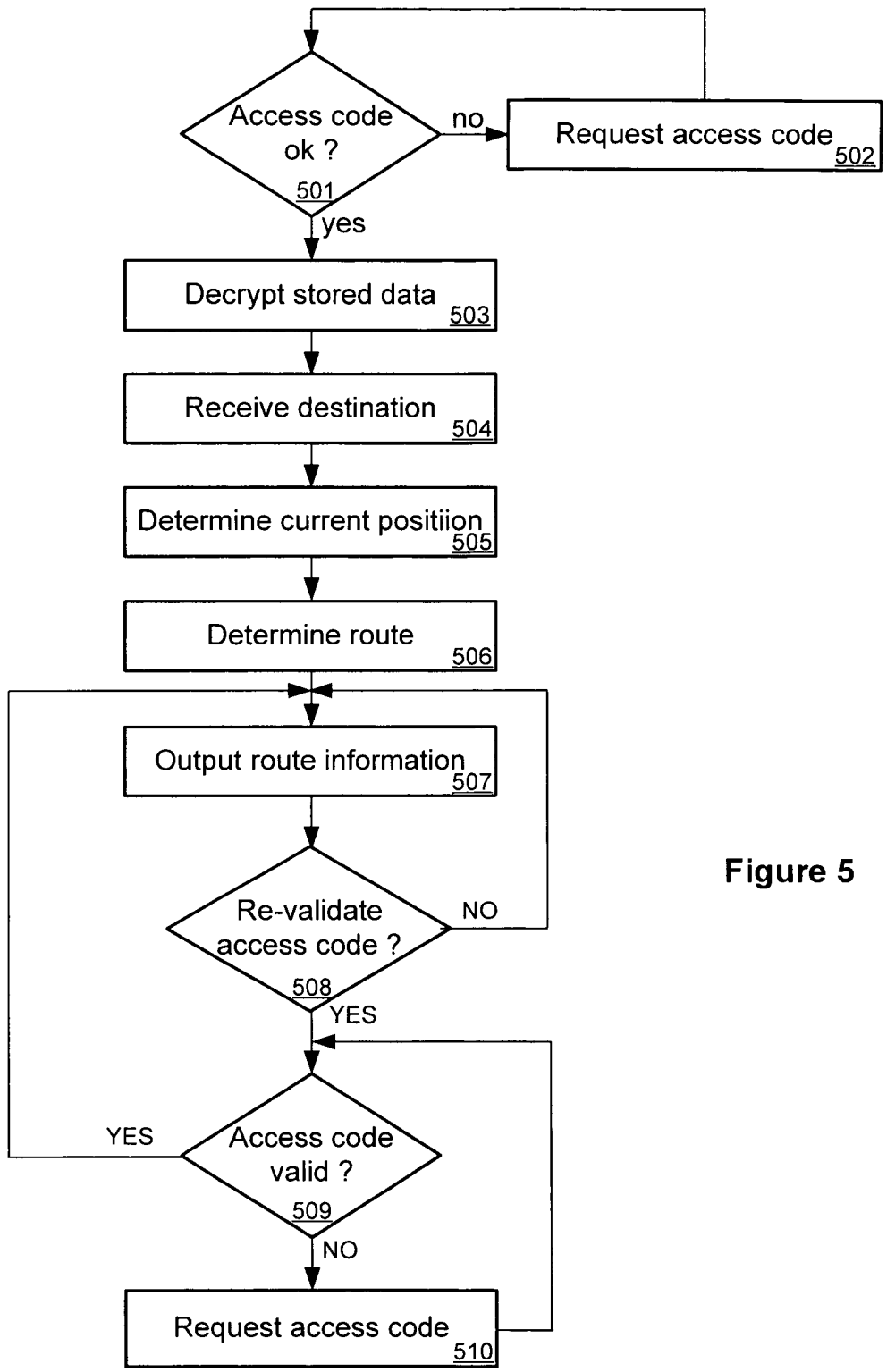
FIG. 5 illustrates a second process that accesses navigation data.

FIG. 5 illustrates a process for providing a user with navigation or route information when navigation data access protected and/or encrypted. The navigation system 100 may authenticate an access code 105, at act 501. The validity of an access code 102 is verified. If no access code 105 is detected or the access code 105 is not valid, the system 100 may request an access code 105, at act 502. The methods may request an access code by prompting to a user through a graphical user interface, command line interface, menu driven interface, or audio interface. If an access code 105 is detected and validated, the stored navigation data may be decrypted using the access code in act 503. Once decrypted, the decrypted navigation data may be stored in a volatile memory.

The system 100 may receive a destination point, at step 504. A user may choose a destination from a list of previously stored destinations. Alternatively, a user may enter a desired destination or enter coordinates to that destination. The navigation system 100 may determine a current position at act 505. This may be done using satellite information. Satellite information may be received through a GPS system. Information received from motion sensors (e.g. speed sensor, gyroscope) may be used with satellite information. Based on a current position and the destination and on the decrypted navigation data and/or the map data, a route may be determined at act 506.

The route information may be transferred at act 507. Route information may include the information instructing a user how to maneuver and efficiently reach a destination. Route information may be displayed or heard. If displayed, route information may be shown on a graphical display such as an LCD, a television monitor, a cathode ray tube (CRT) monitor, a laptop, a PDA screen, and electronic displays. If information is delivered in an audio format, the information may be received through outputs including vehicle speakers, a laptop, a portable electronic device, a cell phone, or other audio-enabled devices.

The navigation system 100 may revalidate the access code 105, at act 508. If the access code 105 is not stored in an expected memory location interfaced to the navigation unit 104 but is stored on an external data carrier 230 such as a CD or DVD, then the validating process may require a user to keep the corresponding data carrier 230 linked with the navigation system 100. This link may include maintaining a tangible or verbal link to the navigation system 100. Validating criteria may be based on a predetermined time interval after the last time the access code. Was checked and/or after a predetermined number of times the navigation data is accessed. The access code 105 may be checked at intervals, such as at about every five minutes during operation of the navigation system 100.

If the access code 105 is not revalidated, the system 100 requests the access code 105, at act 507, and output the upcoming route information. If the access code 105 is validated, the method continues to output the route information at act 507. If no access code 105 is detected or a present access code 105 is invalid, the method continues with step 510 requesting an access code and returns to step 509.

Like the method shown in FIGS. 3-5, the sequence diagrams may be encoded in a signal bearing medium, a computer readable medium such as a memory, programmed within a device such as one or more integrated circuits, or processed by a controller or a computer. If the methods are performed by software, the software may reside in a memory 101 resident to or interfaced to the navigation unit 104, a communication interface, or any other type of non-volatile or volatile memory interfaced or resident to the navigation system 100. The memory may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any logic that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A mobile navigation device comprising:
a non-volatile writable memory that stores navigation data;
means for creating an access protection code for the navigation data, where creation of the access protection code in the mobile navigation device does not utilize the navigation data including navigation data serial numbers and where the access protection code is based on an identification code unique to the mobile navigation device but not the same as the identification code;
means for checking an access code that allows access to navigation data stored in the non-volatile writable memory using the access protection code, wherein the means for checking the access code is further configured to read the access code from a removable storage unit, and the access code comprises at least one read fault error based on at least one defect sector of the removable storage unit, and wherein the means for checking the access code is further configured to periodically check the access code after accessing the navigation data a predetermined number of times, wherein the predetermined number of times comprises two or more times; and
means for outputting at least one of route information and map information derived from the navigation data to a display device based on a result of periodically checking the access code.

2. The mobile navigation device of claim 1 where the means for checking an access code is configured to decrypt the navigation data.

3. The mobile navigation device of claim 1 where the identification code of the mobile navigation device is also an identification code of the navigation data.

4. The mobile navigation device of claim 3 further comprising means for encrypting the navigation data using the access protection code.

5. The mobile navigation device of claim 1 further comprising a user interface configured to retrieve the access code.

6. The mobile navigation device of claim 5 further comprising a storage unit configured to read the access code stored on a removable disk.

7. The mobile navigation device of claim 6 where the removable disk comprises an optical disk.

8. The mobile navigation device of claim 6 where the access code comprises a copy protected access code.

9. The mobile navigation device of claim 8 where the copy protected access code comprises at least one read fault error based on at least one defect sector of the removable disk.

10. The mobile navigation device of claim 5 where the user interface is configured to check the access code of the mobile navigation device.

11. The mobile navigation device of claim 10 where the user interface is further configured to check the access code after a predetermined time interval.

12. The mobile navigation device of claim 1, wherein the means for checking the access code is further configured to periodically check the access code received via a removable storage unit.

13. The mobile navigation device of claim 1, wherein the means for checking the access code is further configured to periodically check the access code received via a connection to an external data source.

14. A method performed in a mobile navigation device for storing digital navigation data in the mobile navigation device having a non-volatile writable memory comprising:
creating an access protection code for navigation data based upon a first unique identification code associated with the mobile navigation device and a second unique identification code associated with the navigation data, where the access protection code is not the same as the first identification code unique to the mobile navigation device or the second identification code unique to the navigation data;
writing the navigation data into the non-volatile writable memory, where the access protection code is operable to encode or decode the navigation data associated with an access code;
periodically checking the access code after accessing the navigation data a predetermined number of times, wherein the predetermined number of times comprises two or more times, wherein periodically checking the access code further comprises reading the access code from a removable storage unit, and the access code comprises at least one read fault error based on at least one defect sector of the removable storage unit; and
outputting at least one of route information and map information derived from the navigation data to a display device based on a result of periodically checking the access code.

15. The method of claim 14 where creating the access protection code further comprises creating the access protection code while writing the navigation data to the non-volatile writable memory.

16. The method of claim 15 where creating the access protection code comprises creating the access protection code using an identification code of the mobile navigation device.

17. The method of claim 16 where the identification code of the mobile navigation device comprises a number that is one of a series of numbers used for identification.

18. The method of claim 17 further comprising encrypting the navigation data using the access protection code.

19. A mobile navigation device comprising:
a navigation unit;
a memory that is configured to store navigation data;
a removable storage unit to store a copy protected access code, where the copy protected access code further comprises at least one read fault error based on at least one defect sector of the removable storage unit;
logic for validating the copy protected access code to allow access to the navigation data stored in the memory, where the logic for validating the copy protected access code is further configured to periodically check the copy protected access code after accessing the navigation data a predetermined number of times; and
logic for creating an access protection code for the navigation data, where the access protection code is based on an identification code unique to the mobile navigation device or the navigation data, where the access protection code is not the same as the identification code.

20. The mobile navigation device of claim 19 where the logic for validating the copy protected access code is further configured to check the copy protected access code after a predetermined time interval.

\* \* \* \* \*